(12) United States Patent
Ozturk et al.

(10) Patent No.: US 12,719,253 B2
(45) Date of Patent: Aug. 25, 2026

(54) SHIELDED BUSBAR

(71) Applicant: EAE ELEKTRIK ASANSOR ENDUSTRI INSAAT SANAYI VETICARET ANONIM SIR, Esenyurt Istanbul (TR)

(72) Inventors: Mustafa Ozturk, Esenyurt Istanbul (TR); Elif Gamze Kaya Ok, Esenyurt Istanbul (TR); Mustafa Mehmet Kaya, Esenyurt Istanbul (TR); Umberto Sordino, Esenyurt Istanbul (TR); Claudio Nicolo', Esenyurt Istanbul (TR)

(73) Assignee: EAE ELEKTRIK ASANSOR ENDUSTRI INSAAT SANAYI VETICARET ANONIM SIR, Esenyurt Istanbul (TR)

( * ) Notice: Subject to any disclaimer, the term of this patent is extended or adjusted under 35 U.S.C. 154(b) by 194 days.

(21) Appl. No.: 18/443,790

(22) Filed: Feb. 16, 2024

(65) Prior Publication Data

US 2024/0283234 A1 Aug. 22, 2024

(30) Foreign Application Priority Data

Feb. 17, 2023 (IT) ........................ 102023000002754

(51) Int. Cl.
*H01B 3/40* (2006.01)
*H01B 3/42* (2006.01)
(Continued)

(52) U.S. Cl.
CPC ................. *H02G 5/06* (2013.01); *H01B 3/40* (2013.01); *H01B 3/423* (2013.01); *H02B 1/21* (2013.01); *H02G 5/005* (2013.01)

(58) Field of Classification Search
CPC ... H02B 1/20; H02B 1/21; H02B 1/53; H02B 1/306; H02B 1/04; H02B 13/025;
(Continued)

(56) References Cited

U.S. PATENT DOCUMENTS 3,584,137 A * 6/1971 Weimer .................. H02G 5/06 174/117 FF
5,552,565 A 9/1996 Cartier et al.
(Continued)

FOREIGN PATENT DOCUMENTS

CN 104218511 12/2014
EP 0936714 8/1999
(Continued)

*Primary Examiner* — Roshn K Varghese
(74) *Attorney, Agent, or Firm* — Millen, White, Zelano & Branigan, P.C.; Christopher W. Brody

(57) ABSTRACT

A shielded busbar has a casing having a duct housing, a conductor pack including three or more conductors arranged side by side, wherein each conductor extends along a longitudinal axis and has a rectangular cross-section. Each conductor has two primary lateral surfaces, which are opposite to each other, and two secondary lateral surfaces, which are opposite to each other, wherein each pair of adjacent conductors of the conductor pack are arranged side by side along respective primary lateral surfaces. The shielded busbar also includes two or more shielding elements extending along the longitudinal axis and made of magnetically shielding material. Each one of the two or more shielding elements has a primary plate that entirely overlaps a primary lateral surface of one or two of the three or more conductors, and wherein not more than one shielding element of the two or more shielding elements has a C-shaped cross-section.

10 Claims, 10 Drawing Sheets

(51) Int. Cl.

| | |
|---|---|
| ***H02B 1/21*** | (2006.01) |
| ***H02G 5/00*** | (2006.01) |
| ***H02G 5/06*** | (2006.01) |

(58) Field of Classification Search

CPC .... H02B 5/00–08; H01B 17/14; H01B 17/18; H01B 3/40; H01B 3/423

See application file for complete search history.

(56) References Cited

U.S. PATENT DOCUMENTS

| | | | | |
|---|---|---|---|---|
| 7,819,676 | B1 | 10/2010 | Cardoso et al. | |
| 8,711,549 | B2 * | 4/2014 | Rodrigues ................ | H02G 5/10<br>174/68.2 |
| 11,451,037 | B2 | 9/2022 | Canova | |
| 2008/0230256 | A1 | 9/2008 | Gilliland | |
| 2009/0178824 | A1 * | 7/2009 | Burguera ................ | H02G 5/06<br>174/68.2 |
| 2021/0391699 | A1 * | 12/2021 | Canova .................... | H02G 5/06 |

FOREIGN PATENT DOCUMENTS

| | | |
|---|---|---|
| JP | 09-182260 | 7/1997 |
| WO | 2005/013450 | 2/2005 |

* cited by examiner 300
310
320
330

250
260
270
220T
200T
220T
200B
200D
210R
210R
210R
210R
210L
210L
210L
210L
220B
200C
220B
200A 310
200C
200D
320
200B
200A
330
250

430T
430B
400
420T
420B
410

300
310
320
330

500A
520A
510A
500B
510B
520B 500A
520A
510A

SHIELDED BUSBAR

TECHNICAL FIELD

The present invention relates to a shielded busbar that allows to achieve high performance in terms of magnetic shielding, heat dissipation and mechanical strength, and that is easy to manufacture and assemble.

STATE OF THE ART

It is known that busbars are rigid devices made up of an external metal casing, for example made of extruded aluminum or steel, having a duct housing internal aluminum or copper bars, having a substantially rectangular cross section, acting as electrical conductors. The busbars are designed as a replacement or an alternative to cables for electric power distribution, and they operate as a system of rigid elements interconnected to electrically join two or more electrical components.

In particular, there are several advantages in using busbars instead of cables for electrical power distribution. For example, the busbars allow to design electrical distribution paths with bends at specific angles, such as for example at 90°, resulting particularly appropriate in environments with limited space or where height changes are required. Furthermore, as busbars are modular elements, their installation prevents the typical problems involved in laying cable such as, for example, the need of using pulling winches, possible cable breaking and symmetry issues. Also, while laying cables requires the preliminary installation of cable trays, a busbar is a self-load-bearing element. Moreover, busbars can always be reused, by moving it from a former installation to a new one. Other advantages of busbars are the possibility of easily selecting the proper conductor section for each required power range, e.g. up to 6300 A and 1000 V, and the availability of derivation points even for high capacity busbars in the case where they operate as plugs or junctions. Finally, some specific types of busbars are capable of having magnetic field values much lower than the corresponding number of cables at the same rated current.

Busbars can be exploited in a large range of applications: from industrial and commercial applications up to applications in areas with an explosive atmosphere, thus satisfying the strict requirements for ATEX applications, e.g. as established by the European Union rules.

At present, there are two types of busbars: ventilated and compact. Ventilated busbars appear to be the most problematic. The installation difficulties, but above all the dissipative gaps (thermal dissipation) often make them inappropriate for most applications. For this reason, air insulation of busbars is considered obsolete.

With reference to the cross section of a conventional compact busbar shown in FIG. 1, a compact busbar includes an external metal casing 100 having a duct housing an internal conductor pack including three or more aluminum or copper bars, acting as electrical conductors 200, arranged side by side and insulated from each other by means of thin insulating layers; in the example of FIG. 1, the conductor pack includes four conductors 200A, 200B, 200C and 200D, as shown in FIG. 1B. In other words, the conductors 200 are placed in the casing 100 in the form of sandwiches ensuring a high proximity between the conductors of different phases. With the compact structure, the size is minimized as much as possible according to the capacity of the carried energy. Furthermore, the compactness of the busbar and the proximity of the conductors of different phases reduce the induced magnetic field even for high currents.

In order to further mitigate the magnetic field, compact busbars have been developed having specific conductor shapes and/or attenuating shielding elements. Some of these prior art busbars are disclosed in documents U.S. Pat. No. 11,451,037B2, WO2005013450A1, JPH09182260A, US2008230256A1, U.S. Pat. No. 7,819,676B1, EP0936714A2, CN104218511A and U.S. Pat. No. 5,552,565A.

However, such prior art solutions suffer from some drawbacks.

First of all, such prior art solutions are not completely efficient in mitigating the magnetic field.

Also, this prior art solutions render manufacturing complex, increasing manufacturing, installation and maintenance costs and hindering their use in large-scale production. For instance, the prior art shielded busbar disclosed in document U.S. Pat. No. 11,451,037B2 has two U-shaped shielding elements which need to be assembled by sliding on the conductor pack and one over the other; this entails that the assembly of the busbars is a complex and long process, mainly due to the mutual friction and to the geometrical mutual arrangement of the shielding elements.

It is an object of this invention, therefore, to overcome the aforementioned problems of the prior art, namely by allowing to achieve high performance in terms of magnetic shielding, eliminating the effects of the magnetic field in an easy and cost-effective way.

It is another object of this invention to achieve an effective heat dissipation and great mechanical strength in a busbar.

SUMMARY OF INVENTION

It is specific subject-matter of the present invention a shielded busbar comprising a casing having a duct housing a conductor pack including three or more conductors arranged side by side, wherein each conductor extends along a longitudinal axis and has a rectangular cross-section, thereby each conductor has two primary lateral surfaces, which are opposite to each other, and two secondary lateral surfaces, which are opposite to each other, wherein each pair of adjacent conductors of the conductor pack are arranged side by side along respective primary lateral surfaces, wherein the shielded busbar further comprises two or more shielding elements extending along said longitudinal axis and made of magnetically shielding material, wherein each one of said two or more shielding elements comprises or consists of a primary plate that entirely overlaps a primary lateral surface of one or two of said three or more conductors, and wherein not more than one shielding element of said two or more shielding elements has a C-shaped cross-section.

According to another aspect of the invention, said two or more shielding elements may consist or include a first shielding element and a second shielding element, wherein:

- in the first shielding element, its primary plate is joined at one of its two longitudinal edges to a secondary plate that is orthogonal to the primary plate, wherein the primary plate entirely overlaps the primary lateral surface of one of the two conductors arranged at the ends of the conductor pack, and wherein the secondary plate entirely overlaps adjacent secondary lateral surfaces of all said three or more conductors of the conductor pack;
- in second shielding element, its primary plate is joined at one of its two longitudinal edges to a secondary plate that is orthogonal to the primary plate, wherein the primary plate entirely overlaps the primary lateral surface of the other one of the two conductors arranged at the ends of the conductor pack, and wherein the secondary plate entirely overlaps the adjacent secondary lateral surfaces of all said three or more conductors of the conductor pack which are opposite to the adjacent secondary lateral surfaces entirely overlapped by the secondary plate of the first shielding element.

According to a further aspect of the invention, the secondary plate of the first shielding element may be joined to an end fin that is orthogonal to the secondary plate and partially overlaps the primary lateral surface of the other one of the two conductors arranged at the ends of the conductor pack that is entirely overlapped by the primary plate of the second shielding element.

According to an additional aspect of the invention, the primary plate of the second shielding element may be further joined at the other one of its two longitudinal edges to an additional secondary plate that is orthogonal to the primary plate, wherein the additional secondary plate entirely overlaps the adjacent secondary lateral surfaces of all said three or more conductors of the conductor pack also entirely overlapped by the secondary plate of the first shielding element, and wherein the two secondary plates joined to the primary plate of the second shielding element are joined to respective end fins, which are orthogonal to the respective secondary plates, wherein the end fins partially overlap the primary lateral surface of the other one of the two conductors arranged at the ends of the conductor pack.

According to another aspect of the invention, said two or more shielding elements may consist or include two or more interposed shielding elements, each consisting of the respective primary plate, wherein each one of said two or more interposed shielding elements is interposed between two adjacent conductors of the conductor pack.

According to a further aspect of the invention, each one of said two or more shielding elements may be made up of two or more longitudinally extending shielding modules.

According to an additional aspect of the invention, each one of said three or more conductors may be coated by one or more electrically insulating coatings, each one of which is made of an electrically insulating selected from the group comprising epoxy resin and thermoplastic polymeric materials.

According to another aspect of the invention, said thermoplastic polymeric materials may be selected from the group comprising polyethylene terephthalate, polystyrene and polyurethane.

According to a further aspect of the invention, said one or more electrically insulating coatings may include a layer of epoxy resin coating each one of said three or more conductors and a film of polyethylene terephthalate wrapped on the layer of epoxy resin.

According to an additional aspect of the invention, the assembly of the conductor pack and said two or more shielding elements may be externally covered by at least one supplementary outer layer or coating, optionally consisting of a film of polyethylene terephthalate.

According to another aspect of the invention, each one of the secondary lateral surfaces may have an area lower than an area of each one of the primary lateral surfaces.

According to a further aspect of the invention, said three or more conductors may consist of four conductors.

The advantages offered by the invention are numerous and significant.

In fact, the shielded busbar according to the invention achieve high performance in terms of magnetic shielding, substantially eliminating the effects of the magnetic field.

Also, the shielded busbar according to the invention is easy to manufacture and assemble, in particular within a manufacturing process having a predetermined step sequence, without requiring any significant modification to the conventional features of the currently available compact busbar, consequently resulting cost-effective.

The shielded busbar according to the invention allows large-scale production as its shielding elements are snap-fitted onto the conductor pack and one over the other(s) and they must not slide on top of the other(s) thus avoiding any form of slipping.

In particular, some embodiments of the shielded busbar according to the invention include two shielding elements which envelop the conductor pack in a flexible manner, so as to be easily assembled during the production process.

The shielded busbar according to the invention allows an optimization of the production process with the significant reduction of tolerances that leads, in common size embodiments of the conductor pack, to have magnetic field values below 0.27 microtesla (μT) at 1000 millimetres when a current of 4000 Ampere flows through the conductor pack.

BRIEF DESCRIPTION OF THE DRAWINGS

The present invention will be now described, by way of illustration and not by way of limitation, according to its preferred embodiments, with particular reference to the Figures of the attached drawings, in which.

In the Figures identical reference numerals will be used for alike elements.

DETAILED DESCRIPTION OF THE INVENTION

Figure 1A:
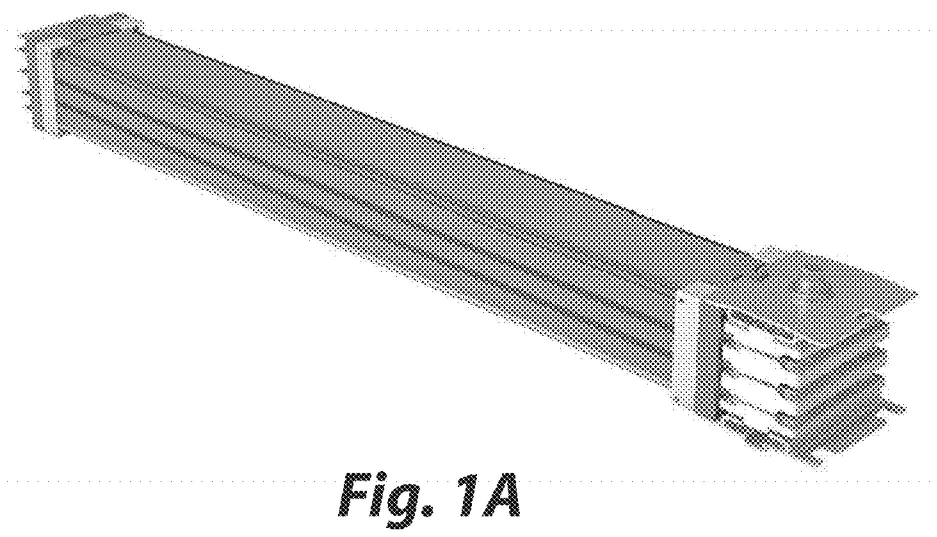
FIG. 1 shows a perspective view (FIG. 1A) and a cross-section view (FIG. 1B) of a prior art busbar.
Figure 1B:
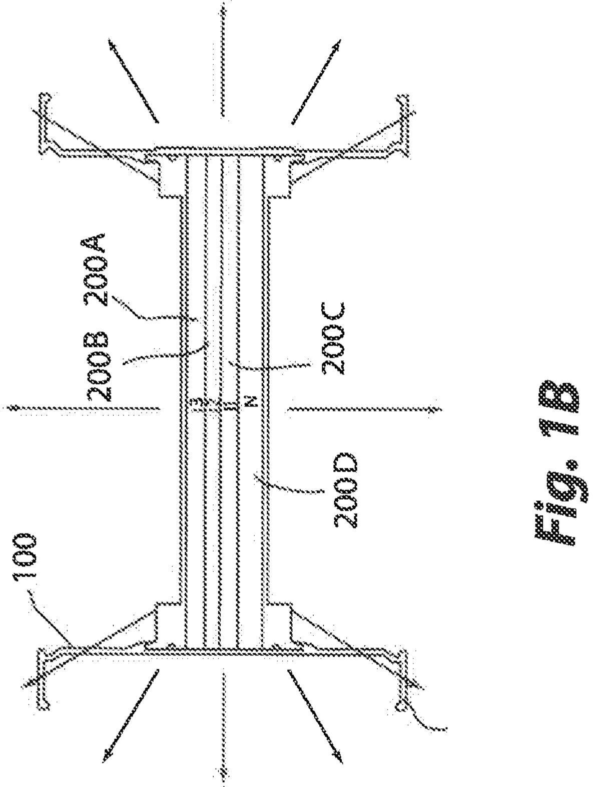
Figure 2:
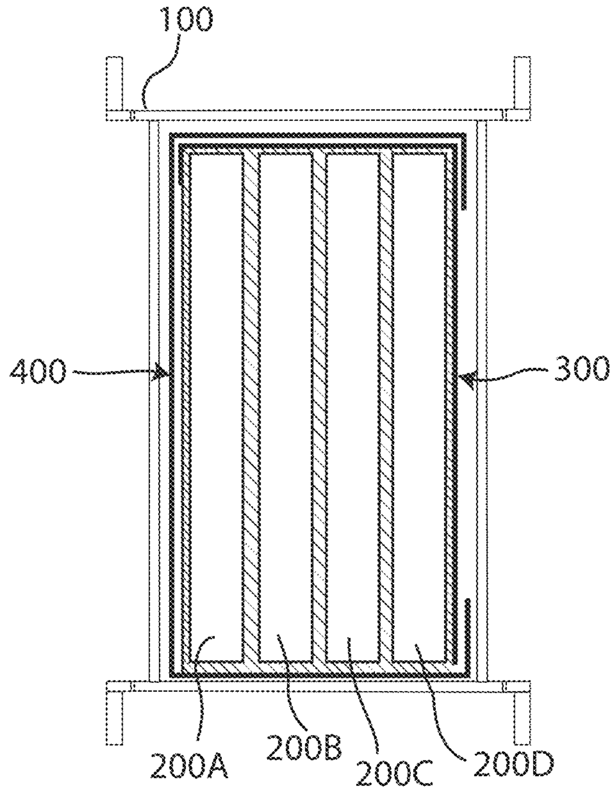
FIG. 2 shows a cross-section view of a first embodiment of the shielded busbar according to the invention.

FIG. 2 shows the cross section of a first embodiment of the shielded busbar according to the invention, wherein the cross section is orthogonal to the longitudinal axis along which the conductors 200 extend. In detail, the shielded busbar comprises a casing 100 having a duct housing a conductor pack 250, also shown in FIG. 3, including four conductors 200A, 200B, 200C and 200D, which are arranged side by side. Thereby, the four conductors 200 of the conductor pack 250 define two external primary lateral surfaces of the conductor pack 250 and six internal primary lateral surfaces of said conductor pack 250.

Each conductor 200 has a substantially rectangular cross-section, i.e. it has a rectangular cross-section apart from the usual mechanical tolerances. Thus, each conductor 200 has two primary lateral surfaces 210R and 210L, opposite to each other, and two secondary lateral surfaces 220T and 220B, opposite to each other. Each pair of adjacent conductors 200 of the conductor pack 250 are arranged side by side along respective primary lateral surfaces 210. In other words, respective primary lateral surfaces 210 of adjacent conductors 200 of the conductor pack 250 face each other; for instance, as shown in FIG. 3, the adjacent conductors 200A and 200B have the primary lateral surface 210R of conductor 200A facing the primary lateral surface 210L of conductor 200B.

Figures 3, 4:
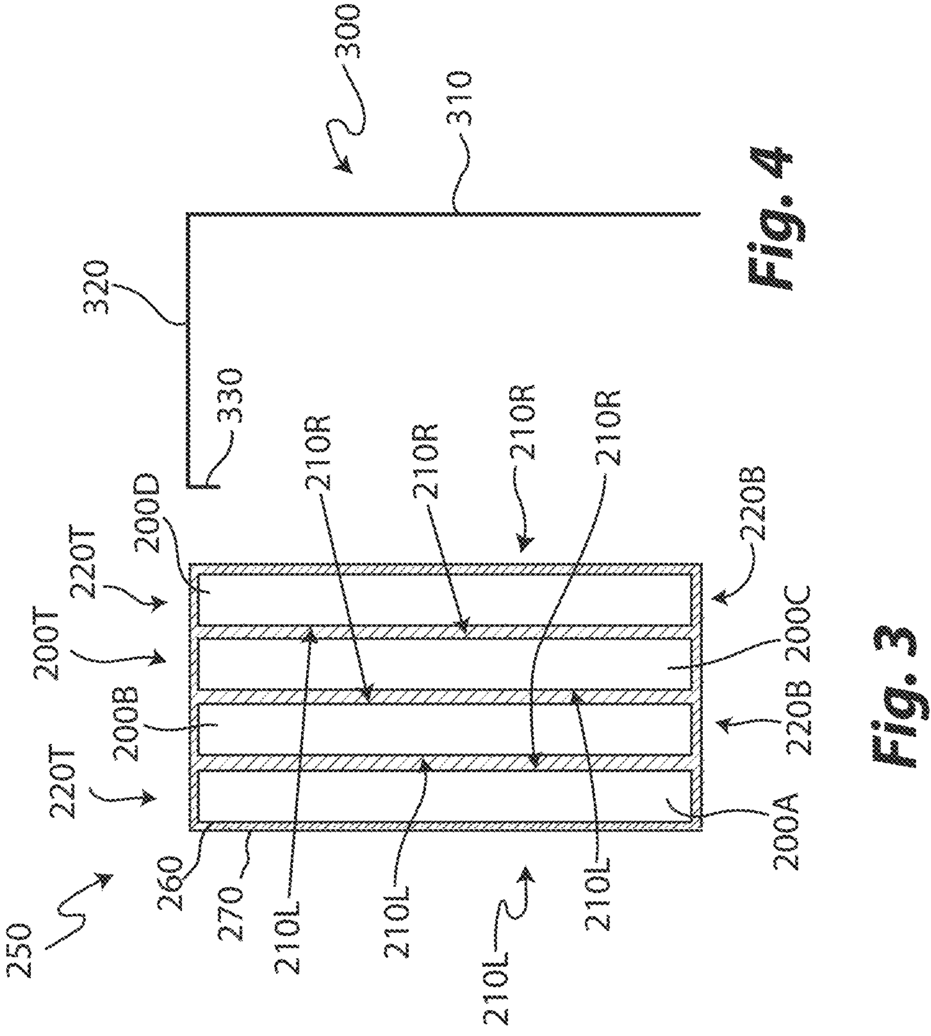
FIGS. 3-7 show cross-section views of parts of the shielded busbar of FIG. 2.
Figures 5, 6:
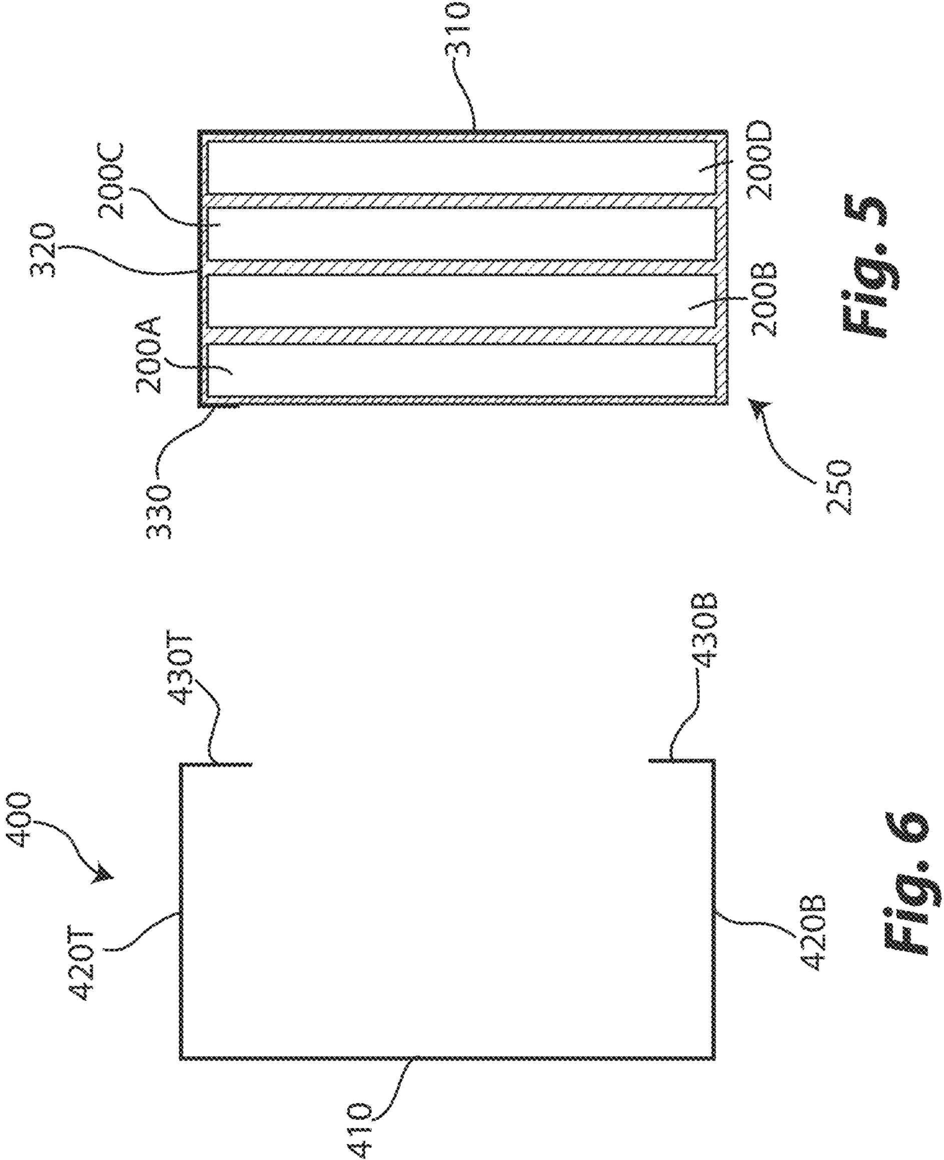

As shown in FIGS. 2, 4 and 6, the first embodiment of the shielded busbar according to the invention further comprises two longitudinally extending shielding elements 300 and 400, thereby such two shielding elements 300 and 400 extend along the longitudinal axis along which the conductors 200 extend. The first shielding element 300 is L-shaped, while the second shielding element 400 is C-shaped. The two shielding elements 300 and 400 are made of magnetically shielding material, i.e. ferromagnetic material.

Figure 7:
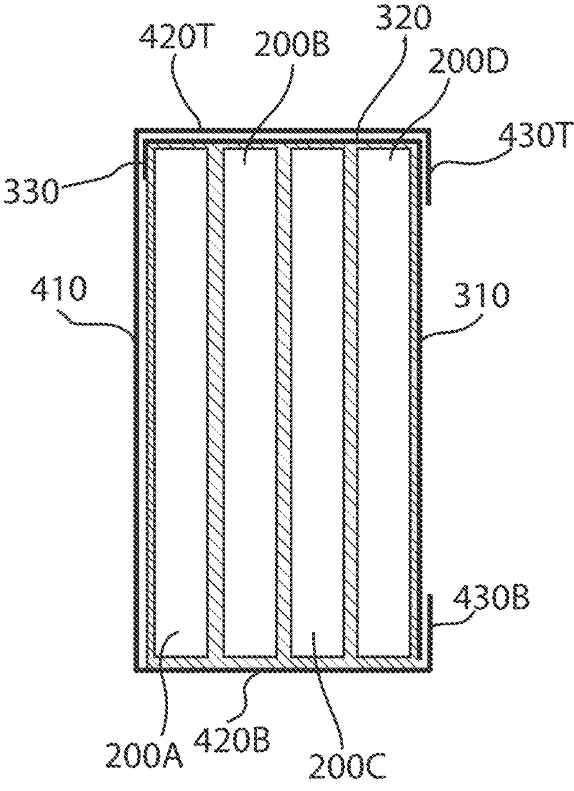

With particular reference to FIG. 4, the first shielding element 300 has a primary plate 310, configured to entirely overlap a primary lateral surface 210 of one of the two conductors 200 arranged at the ends of the conductor pack 250. The primary plate 310 is joined at one of its two longitudinal edges to a secondary plate 320 that is orthogonal to the primary plate 310, wherein the secondary plate 320 entirely overlaps the adjacent secondary lateral surfaces 220T or 220B, of all the conductors 200 of the conductor pack 250, when the primary plate 310 entirely overlaps the primary lateral surface 210 of one of the two conductors 200 arranged at the ends of the conductor pack 250; such arrangement is shown in FIGS. 2 and 7, where the secondary plate 320 is shown as overlapping the adjacent secondary lateral surfaces 220T at the top side of the conductor pack 250. Finally, at the longitudinal edge opposite to the longitudinal edge joined to the primary plate 310, the secondary plate 320 is joined to an end fin 330 that is orthogonal to the secondary plate 320, and thus parallel to the primary plate 310. As shown in FIGS. 2 and 7, when the primary plate 310 entirely overlaps the primary lateral surface 210 of one of the two conductors 200 arranged at the ends of the conductor pack 250, the end fin 330 partially overlaps the primary lateral surface 210 of the other one of the two conductors 200 arranged at the ends of the conductor pack 250.

With particular reference to FIG. 6, the second shielding element 400 has a primary plate 410, configured to entirely overlap a primary lateral surface 210 of one of the two conductors 200 arranged at the ends of the conductor pack 250. The primary plate 410 is joined at its two longitudinal edges to two respective secondary plates 420B and 420T, which are both orthogonal to the primary plate 410, wherein the two secondary plates 420B and 420T entirely overlap the secondary lateral surfaces 220B and 220T of all the conductors 200 of the conductor pack 250 when the primary plate 410 entirely overlaps the primary lateral surface 210 of one of the two conductors 200 arranged at the ends of the conductor pack 250, as shown in FIGS. 2 and 7; the two secondary plates 420B and 420T substantially have the same width. Finally, at the edge opposite to the edge joined to the primary plate 410, the two secondary plates 420B and 420T are joined to respective end fins 430B and 430T, which are orthogonal to the respective secondary plates 420B and 420T, and thus parallel to the primary plate 410. As shown in FIGS. 2 and 7, when the primary plate 410 entirely overlaps the primary lateral surface 210 of one of the two conductors 200 arranged at the ends of the conductor pack 250, the end fins 430B and 430T partially overlap the primary lateral surface 210 of the other one of the two conductors 200 arranged at the ends of the conductor pack 250.

As shown in FIG. 3-7, the two shielding elements 300 and 400 are configured to be easily assembled on the conductor pack 250.

In fact, as shown in FIGS. 3 to 5, the first shielding element 300 is mounted on the conductor pack 250 so that its primary plate 310 entirely overlaps the primary lateral surface 210R of one of the two conductors 200 arranged at the ends of the conductor pack 250 and its end fin 330 partially overlaps the primary lateral surface 210L of the other one of the two conductors 200 arranged at the ends of the conductor pack 250, thus obtaining the arrangement shown in FIG. 5. Alternatively, the conductor pack 250 can be inserted in the first shielding element 300 obtaining the arrangement shown in FIG. 5.

Then, as shown in FIGS. 6 and 7, the second shielding element 400 is snap-fitted onto the assembly formed by the first shielding element 300 and the conductor pack 250 so that its primary plate 410 entirely overlaps the primary lateral surface 210L of the other one of the two conductors 200 arranged at the ends of the conductor pack 250 and its end fins 430B and 430T partially overlap the primary lateral surface 210R of the one of the two conductors 200 arranged at the ends of the conductor pack 250, thus obtaining the arrangement shown in FIG. 7. In particular, such operation is extremely fast and can be included in a production line using machinery properly calibrated to exert the force sufficient for the snap-fitting coupling of the second shielding element 400 onto the assembly formed by the first shielding element 300 and the conductor pack 250. As shown in FIG. 7, the conductor pack 250 is entirely magnetically shielded and is configured to be inserted in the duct of the casing 100, as shown in FIG. 2.

In the FIGS. 2-7, the second shielding element 400 is superimposed to the first shielding element 300. However, it must be noted that, in other embodiments of the shielded busbar according to the invention, the two shielding elements 300 and 400 can be configured to be assembled in reverse order, i.e. wherein the second shielding element 400 is first snap-fitted onto the conductor pack 250 and then the first shielding element 300 is mounted on the assembly formed by the conductor pack 250 and the second shielding element 400, and consequently the first shielding element 300 is superimposed to the second shielding element 400, still remaining within the scope of protection of the present invention as defined in the attached claims.

It must be noted that, in the first embodiment of the shielded busbar according to the invention, only one shielding element of the two shielding elements 300 and 400, namely the second shielding element 400, has a C-shaped cross-section (that is equivalent to a U-shaped cross-section), and none shielding element entirely overlaps the primary plate of any other shielding element, since the second shielding element 400 entirely overlaps only the secondary plate 320 and the end fin 330 of the shielding element 300.

The shielded busbar shown in FIGS. 2-7 has two electrically insulating coatings covering each one of the conductors 200 of the conductor pack 250. In particular, each conductor 200 is optionally coated by a layer 260 of epoxy resin and wrapped with a film 270 of thermoplastic polymeric material, optionally selected from the group comprising polyethylene terephthalate, polystyrene and polyurethane; preferably, the film 270 is made of polyethylene terephthalate. Advantageously, the layer 260 of epoxy resin, that can optionally be deposited or painted on each conductor 200, operates as a barrier to humidity and allow to better control humidity inside the shielded busbar, preserving the initial conditions of the duct of the casing 100 for an extremely long time, namely for decades. Such double insulation makes the shielded busbar particularly efficient in terms of both heat dissipation, whose efficiency also depends on the shape of the casing, and magnetic field suppression. Furthermore, such double insulation has exceptional fire resistance properties, a high degree of resistance to mechanical shocks, making the shielded busbar according to the invention usable in applications in areas with an explosive atmosphere, meeting the ATEX requirements, and in underwater applications, meeting the IP68 requirements through the direct combinability of elements engineered for those applications.

It must be noted that other embodiments of the shielded busbar according to the invention may have each one of the conductors 200 of the conductor pack 250 that is coated by a number of electrically insulating coatings different from two, e.g. by only one coating or by three or more coatings.

The conductor pack 250 is also covered as a whole by an overall outer layer or coating, optionally consisting of a film of polyethylene terephthalate. In combination with or alternatively to such overall layer or coating of the conductor pack 250, the assembly of the conductor pack 250 and the first and second shielding elements 300 and 400 can be externally covered by a supplementary outer layer or coating, optionally consisting of a film of polyethylene terephthalate.

Each one of the conductors 200 of the conductor pack 250 is conventionally made of copper or aluminium and it is optionally tin-coated.

The casing 100 is shaped so as to promote heat dissipation, decrease electromagnetic interferences, facilitate shielded busbar installation, and have a high mechanical robustness; the casing 100 is optionally made of extruded aluminum.

Advantageously, the first and second shielding elements 300 and 400 can be implemented as folded plates.

Figures 8, 9:
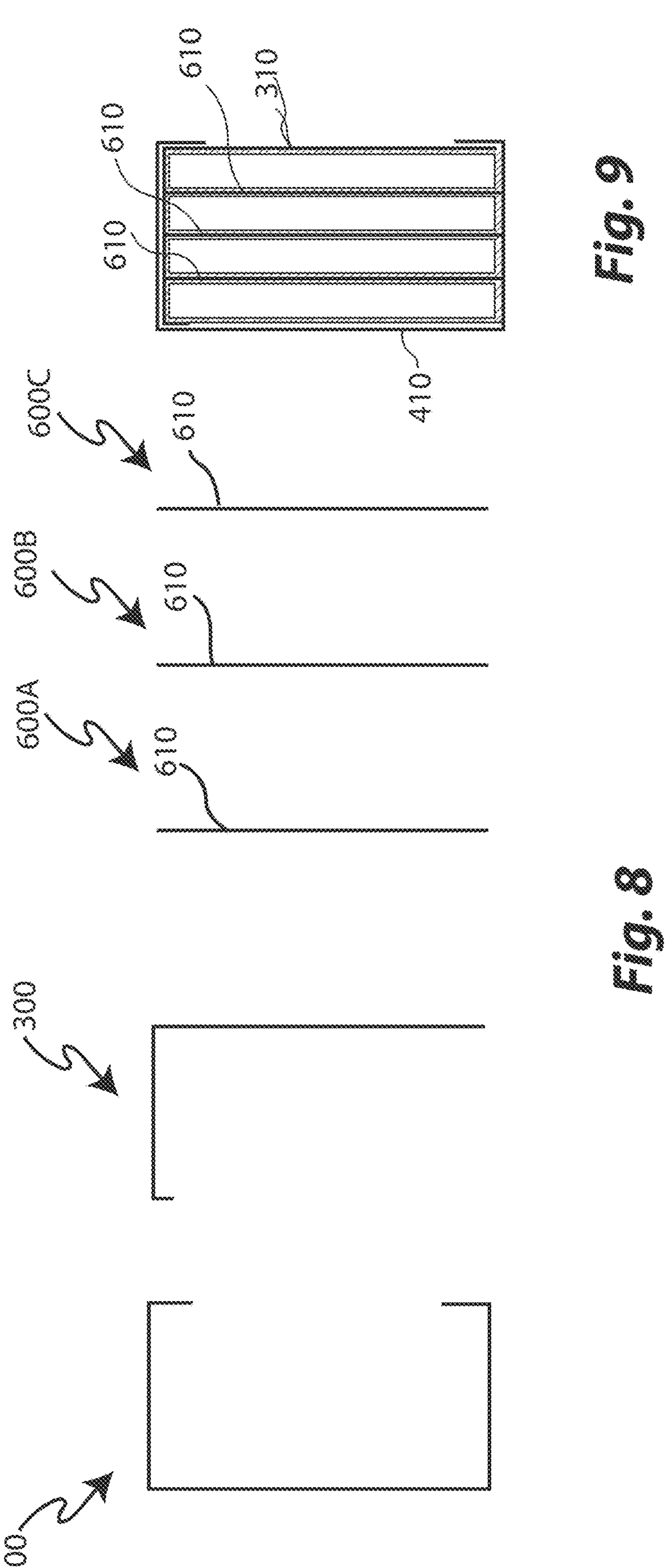
FIGS. 8 and 9 show cross-section views of parts of a second embodiment of the shielded busbar according to the invention.

FIG. 8 shows a second embodiment of the shielded busbar according to the invention that further comprises, along with the first and second shielding elements 300 and 400, three longitudinally extending interposed shielding elements 600A, 600B and 600C of a third type, each consisting of a primary plate 610 that entirely overlaps the facing primary lateral surfaces 210 of two adjacent conductors 200 of the conductor pack 250, as shown in FIG. 9. In other words, each one of the three interposed shielding elements 600A, 600B and 600C is interposed between two adjacent conductors 200 of the conductor pack 250. In this case, the possibly present overall outer layer or coating of the conductor pack 250 is applied after the insertion of the three interposed shielding elements 600A, 600B and 600C.

It must be noted that, in the second embodiment of the shielded busbar according to the invention, only one shielding element of the five shielding elements 300, 400, 600A, 600B and 600C, namely the second shielding element 400, has a C-shaped cross-section, and none shielding element entirely overlaps the primary plate of any other shielding element, since the second shielding element 400 entirely overlaps only the secondary plate 320 and the end fin 330 of the shielding element 300.

Figures 10, 11:
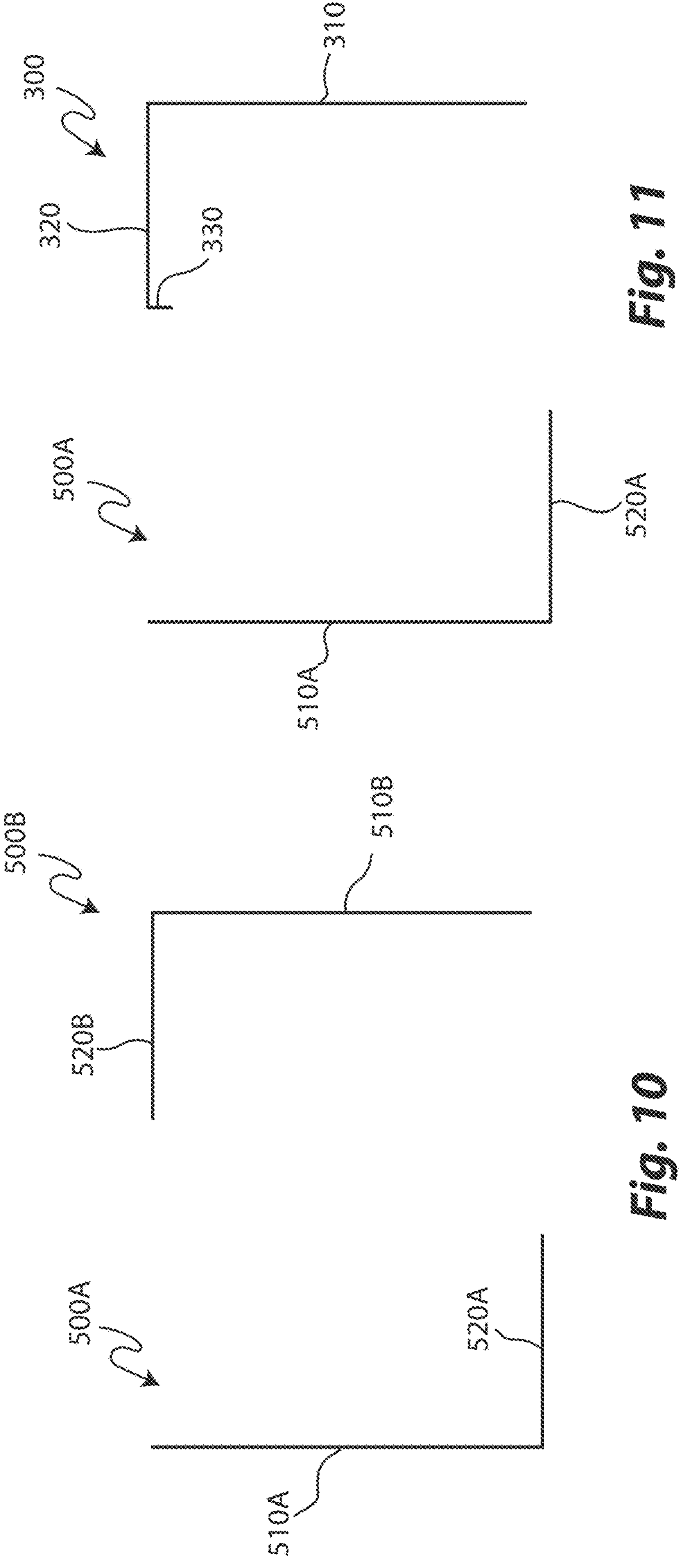
FIG. 10 shows a cross-section view of parts of a third embodiment of the shielded busbar according to the invention.
FIG. 11 shows a cross-section view of parts of a fourth embodiment of the shielded busbar according to the invention.

A third embodiment of the shielded busbar according to the invention comprises two longitudinally extending shielding elements 500A and 500B, shown in FIG. 10, which have a shape different from the each one of the two shielding elements 300 and 400 of FIGS. 2 and 4-7. In particular, such two shielding elements 500A and 500B are L-shaped, and each one has a primary plate 510A and 510B, respectively, configured to entirely overlap a primary lateral surface 210 of one of the two conductors 200 arranged at the ends of the conductor pack 250. The primary plate, 510A or 510B, is joined at one of its two longitudinal edges to a secondary plate, 520A or 520B, that is orthogonal to the primary plate, 510A or 510B, wherein the secondary plate, 520A or 520B, entirely overlaps the adjacent secondary lateral surfaces, 220T or 220B, of all the conductors 200 of the conductor pack 250, when the primary plate, 510A or 510B, entirely overlaps the primary lateral surface 210 of one of the two conductors 200 arranged at the ends of the conductor pack 250. In order to entirely magnetically shield the conductor pack 250 shown in FIG. 2, the two shielding elements 500A and 500B have to be mounted onto the conductor pack 250 so that each of their primary plates 510A and 510B entirely overlaps the primary lateral surface of a respective one of the two conductors 200 arranged at the ends of the conductor pack 250, and so that the secondary plate 520A of one of them entirely overlaps the adjacent secondary lateral surfaces 220B of all the conductors 200 of the conductor pack 250 which are opposite to the adjacent secondary lateral surfaces 220T which are entirely overlapped by the secondary plate 520B of the other one of the two shielding elements 500A and 500B.

Advantageously, the two shielding elements 500A and 500B can be implemented as folded plates.

It must be noted that, in the third embodiment of the shielded busbar according to the invention, none of the two shielding elements 500A and 500B has a C-shaped cross-section and entirely overlaps the primary plate, nor any other plate, of the other shielding element.

As shown in FIG. 11, a fourth embodiment of the shielded busbar according to the invention comprises the first shielding element 300 of FIG. 4 and the third shielding element 500A of FIG. 10. In order to entirely magnetically shield the conductor pack 250 shown in FIG. 2, such shielding elements 300 and 500A have to be mounted onto the conductor pack 250 so that each of their primary plates 310 and 510A entirely overlaps the primary lateral surface of a respective one of the two conductors 200 arranged at the ends of the conductor pack 250, and so that the secondary plate 520A of the shielding elements 500A entirely overlaps the adjacent secondary lateral surfaces 220B of all the conductors 200 of the conductor pack 250 which are opposite to the adjacent secondary lateral surfaces 220T which are entirely overlapped by the secondary plate 320 of the shielding elements 300.

It must be noted that, in the fourth embodiment of the shielded busbar according to the invention, none of the two shielding elements 500A and 300 has a C-shaped cross-section and entirely overlaps the primary plate, nor any other plate, of the other shielding element.

Any of the third and fourth embodiments of the shielded busbar according to the invention may also comprise the three longitudinally extending shielding elements 600A, 600B and 600C shown in FIG. 8.

It must be noted that other embodiments of the shielded busbar according to the invention may also comprise the second shielding element 400 of FIG. 6 and the third shielding element 500A of FIG. 10, still remaining within the scope of protection of the invention as defined by the attached claims.

Figure 13:
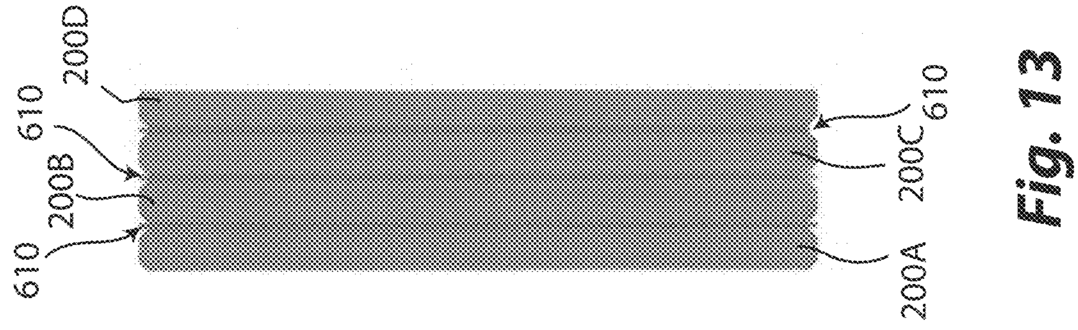
FIGS. 12 and 13 show cross-section views of parts of a fifth embodiment of the shielded busbar according to the invention.
Figure 12:
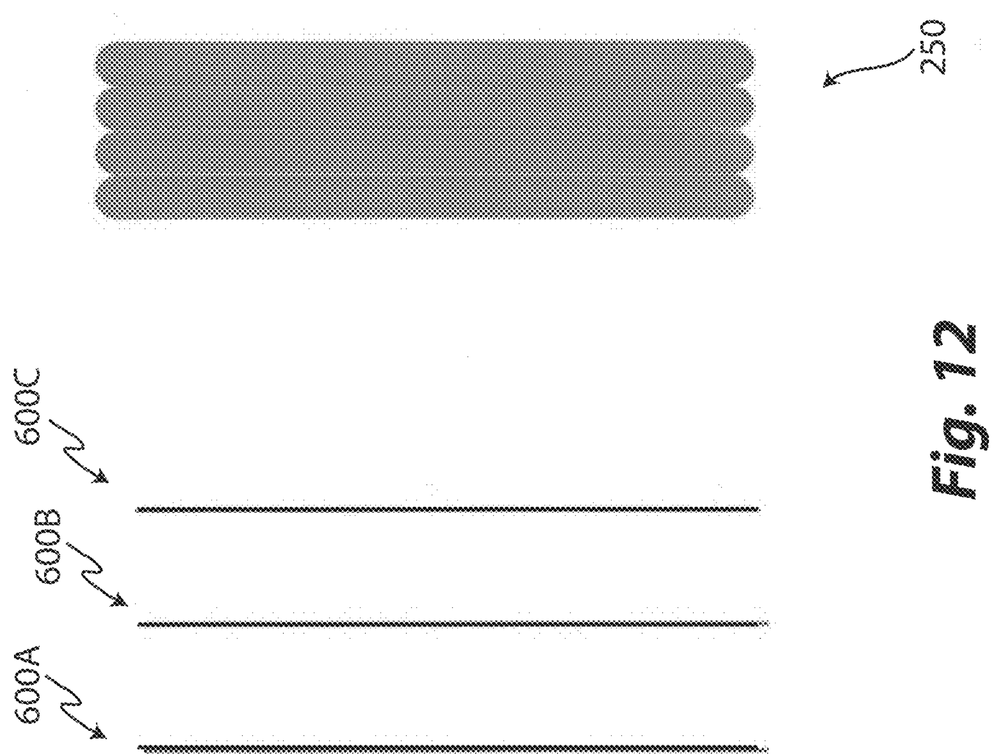

As shown in FIGS. 12 and 13, a fifth embodiment of the shielded busbar according to the invention may include, as shielding elements, only the three interposed shielding elements 600A, 600B and 600C shown in FIG. 8.

It must be noted that, in the fifth embodiment of the shielded busbar according to the invention, none of the three interposed shielding elements 600A, 600B and 600C has a C-shaped cross-section and entirely overlaps the primary plate, nor any other plate, of the other shielding elements.

In other words, the shielded busbar according to the invention comprises two or more shielding elements extending along said longitudinal axis and made of magnetically shielding material, wherein not more than one shielding element of said two or more shielding elements has a C-shaped cross-section. Consequently, none of said two or more shielding elements entirely overlaps the primary plate of the other ones of said two or more shielding elements.

Figure 14:
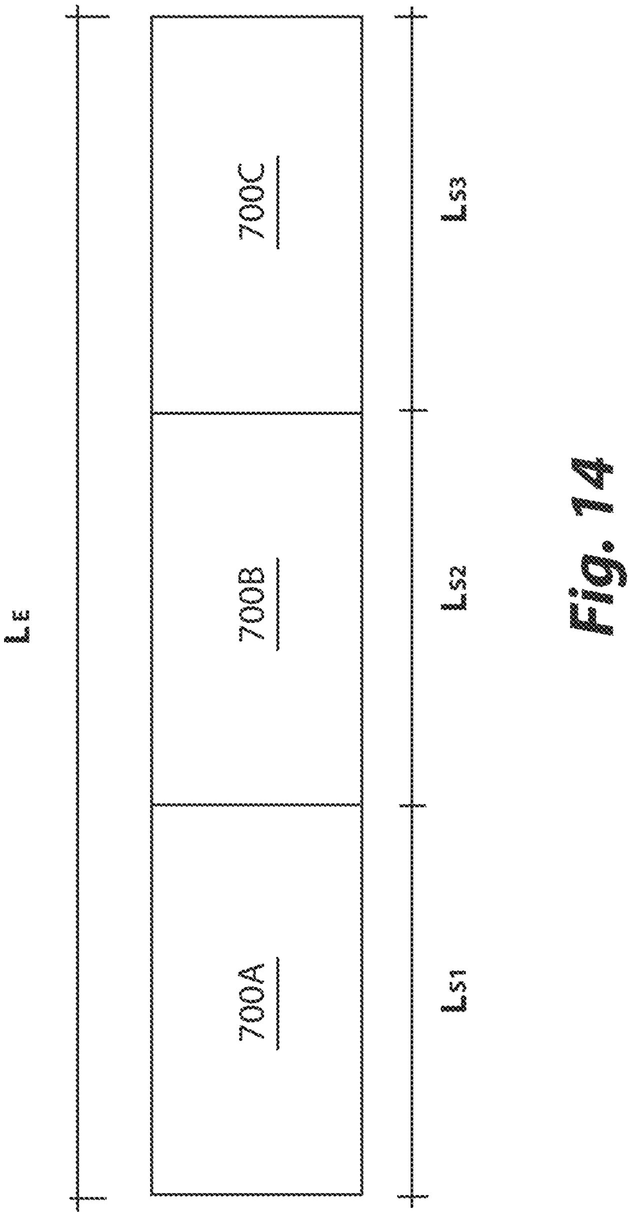
FIG. 14 show a side view of parts of another embodiment of the shielded busbar according to the invention.

Although the shielding elements can have the same longitudinal length of the conductors 200, other embodiments of the shielded busbar according to the invention have at least one of the shielding elements that is made up of two or more longitudinal shielding modules. FIG. 14 shows three longitudinal shielding modules 700A, 700B and 700C, having lengths $L_{S1}$, $L_{S2}$ and $L_{S3}$, optionally equal to each other; the three longitudinal shielding modules 700A, 700B and 700C are in contact with each other through their end edges so as to ensure the shielding of the conductor pack; the overall length of the three longitudinal shielding modules 700A, 700B and 700C is equal to the length $L_E$ of the conductor pack:

$$L_E = L_{S1} + L_{S2} + L_{S3}$$

In the Figures, the conductor pack 250 is always shown as including four conductors 200A, 200B, 200C and 200D. However, it must be noted that other embodiments of the shielded busbar according to the invention can have a conductor pack including a different number of conductors starting from three, i.e. any number equal to three or more than three conductors, e.g. five conductors, still remaining within the scope of protection of the invention as defined by the attached claims.

Also, in the Figures, the conductors 200A, 200B, 200C and 200D have been shown as having the primary lateral surfaces corresponding to the longest side of the rectangular cross-section, thereby the two secondary lateral surfaces have each an area lower than the area of each one of the two primary lateral surfaces. However, it must be noted that other embodiments of the shielded busbar according to the invention can have the conductor pack where the primary lateral surfaces of the conductors correspond to the shortest side of the rectangular cross-section thereof, thereby the two primary lateral surfaces have each an area lower than the area of each one of the two secondary lateral surfaces, still remaining within the scope of protection of the invention as defined by the attached claims.

The shielded busbar according to the invention achieves an effective mitigation of the magnetic field and extremely low values thereof already at 100 millimetres from the conductor pack, which are almost irrelevant at 500 millimetres and substantially irrelevant at 1000 millimetres, well below the magnetic field values which are considered safe for the health of living beings according to many laws currently in force, like the Italian Decree of the President of the Ministerial Council of 8 Jul. 2003.

In particular, when applied to common size conductor packs, the shielded busbar according to the invention achieves value below the value of 0.6 μT at 1 m for high currents and disappears completely for lower current ranges. For example, the shielded busbar according to the invention achieves a value of 0.27 microtesla at 1000 millimetres when a current of 4000 Ampere flows through the conductor pack, and this magnetic field value is concealed by the background noise of the geomagnetic field.

The preferred embodiments of this invention have been described and a number of variations have been suggested hereinbefore, but it should be understood that those skilled in the art can make variations and changes, without so departing from the scope of protection thereof, as defined by the attached claims.

The invention claimed is:

1. A shielded busbar comprising a casing having a duct housing a conductor pack including three or more conductors arranged side by side, wherein each conductor extends along a longitudinal axis and has a rectangular cross-section, thereby each conductor has two primary lateral surfaces, which are opposite to each other, and two secondary lateral surfaces, which are opposite to each other, wherein each pair of adjacent conductors of the conductor pack are arranged side by side along respective primary lateral surfaces, wherein the shielded busbar further comprises two or more shielding elements extending along said longitudinal axis and made of magnetically shielding material, wherein each one of said two or more shielding elements comprises or consists of a primary plate that entirely overlaps a primary lateral surface of one or two of said three or more conductors, and wherein not more than one shielding element of said two or more shielding elements has a C-shaped cross-section;

wherein said two or more shielding elements include a first shield in the first shielding element, its primary plate is joined at one of its two longitudinal edges to a secondary plate that is orthogonal to the primary plate, wherein the primary plate entirely overlaps the primary lateral surface of one of the two conductors arranged at the ends of the conductor pack, and wherein the secondary plate entirely overlaps adjacent secondary lateral surfaces of all said three or more conductors of the conductor pack;

in second shielding element, its primary plate is joined at one of its two longitudinal edges to a secondary plate that is orthogonal to the primary plate, wherein the primary plate entirely overlaps the primary lateral surface of the other one of the two conductors arranged at the ends of the conductor pack, and wherein the secondary plate entirely overlaps the adjacent secondary lateral surfaces of all said three or more conductors of the conductor pack which are opposite to the adjacent secondary lateral surfaces entirely overlapped by the secondary plate of the first shielding element;

wherein the primary plate of the second shielding element is further joined at the other one of its two longitudinal edges to an additional secondary plate that is orthogonal to the primary plate, wherein the additional secondary plate entirely overlaps the adjacent secondary lateral surfaces of all said three or more conductors of the conductor pack also entirely overlapped by the secondary plate of the first shielding element, and wherein the two secondary plates joined to the primary plate of the second shielding element are joined to respective end fins, which are orthogonal to the respective secondary plates, wherein the end fins partially overlap the primary lateral surface of the other one of the two conductors arranged at the ends of the conductor pack.

2. The shielded busbar according to claim 1, wherein the secondary plate of the first shielding element is joined to an end fin that is orthogonal to the secondary plate and partially overlaps the primary lateral surface of the other one of the two conductors arranged at the ends of the conductor pack that is entirely overlapped by the primary plate of the second shielding element.

3. The shielded busbar according to claim 1, wherein said two or more shielding elements consist or include two or more interposed shielding elements, each consisting of the respective primary plate, wherein each one of said two or more interposed shielding elements is interposed between two adjacent conductors of the conductor pack.

4. The shielded busbar according to claim 1, wherein each one of said two or more shielding elements is made up of two or more longitudinally extending shielding modules.

5. The shielded busbar according to claim 1, wherein each one of said three or more conductors is coated by one or more electrically insulating coatings, each one of which is made of an electrically insulating selected from the group comprising epoxy resin and thermoplastic polymeric materials.

6. The shielded busbar according to claim 5, wherein said thermoplastic polymeric materials are selected from the group comprising polyethylene terephthalate, polystyrene and polyurethane.

7. The shielded busbar according to claim 6, wherein said one or more electrically insulating coatings include a layer of epoxy resin coating each one of said three or more conductors and a film of polyethylene terephthalate wrapped on the layer of epoxy resin.

8. The shielded busbar according to claim 1, wherein the assembly of the conductor pack and said two or more shielding elements are externally covered by at least one supplementary outer layer or coating, optionally consisting of a film of polyethylene terephthalate.

9. The shielded busbar according to claim 1, wherein each one of the secondary lateral surfaces has an area lower than an area of each one of the primary lateral surfaces.

10. The shielded busbar according to claim 1, wherein said three or more conductors consist of four conductors.

* * * * *